United States Patent
Hoyl et al.

(10) Patent No.: US 7,588,216 B1
(45) Date of Patent: Sep. 15, 2009

(54) FIBER OPTIC CABLING MANAGEMENT USING HOOK AND LOOP FABRIC

(75) Inventors: Bradley S. Hoyl, Frisco, TX (US); Carl G. Harrison, Plano, TX (US); Maurice Robertson, Rowlett, TX (US)

(73) Assignee: Cisco Technology, Inc., San Jose, CA (US)

( * ) Notice: Subject to any disclaimer, the term of this patent is extended or adjusted under 35 U.S.C. 154(b) by 754 days.

(21) Appl. No.: 09/812,247

(22) Filed: Mar. 19, 2001

(51) Int. Cl.
*F16L 3/12* (2006.01)

(52) U.S. Cl. .................... 248/74.3; 248/69; 248/205.2; 248/909; 24/306; 385/134; 312/222; 174/50; 361/608; 211/26

(58) Field of Classification Search ............ 24/306, 24/30.5 P, 30.5 R, 452; 248/909, 548, 53, 248/743, 69, 205.2; 385/134, 135, 136, 137; 312/222, 223, 265.1, 265.4; 174/50, 57, 174/69, 729, 135, 48, DIG. 9; 361/608, 725, 361/727, 326; 211/26

See application file for complete search history.

(56) References Cited

U.S. PATENT DOCUMENTS

| | | | | |
|---|---|---|---|---|
| 3,408,705 A | * | 11/1968 | Kayser et al. ............ 24/452 |
| 4,074,397 A | * | 2/1978 | Rosin ..................... 24/73 |
| 4,548,200 A | * | 10/1985 | Wapner ................ 128/207.17 |
| 4,617,017 A | * | 10/1986 | Hubbard et al. ........... 604/179 |
| 4,934,646 A | * | 6/1990 | Doyle .................. 248/309.1 |
| 5,048,158 A | * | 9/1991 | Koerner .................. 24/16 R |
| 5,242,063 A | * | 9/1993 | Ericksen et al. ........... 211/87 |
| 5,300,037 A | * | 4/1994 | Delk et al. .............. 604/180 |
| 5,604,961 A | * | 2/1997 | Cole ...................... 24/306 |
| 5,624,403 A | * | 4/1997 | Jaquith ................ 604/179 |
| 5,671,511 A | * | 9/1997 | Hattori et al. ............ 24/444 |
| 5,691,021 A | | 11/1997 | Kobe ..................... 428/40.1 |
| 5,758,002 A | * | 5/1998 | Walters ................. 385/134 |
| 6,000,664 A | * | 12/1999 | Hood .................... 248/102 |
| 6,044,525 A | | 4/2000 | Sastre et al. ............. 24/20 R |
| 6,070,742 A | * | 6/2000 | McAnally et al. .......... 211/26 |
| 6,326,547 B1 | * | 12/2001 | Saxby et al. ............. 174/69 |
| 6,327,139 B1 | * | 12/2001 | Champion et al. ......... 361/608 |
| 6,435,354 B1 | * | 8/2002 | Gray et al. ............... 211/26 |
| 6,501,020 B2 | * | 12/2002 | Grant et al. .............. 174/50 |

* cited by examiner

*Primary Examiner*—Kimberly T. Wood
(74) *Attorney, Agent, or Firm*—Campbell Stephenson LLP

(57) ABSTRACT

An apparatus and method for cable management via hook and loop type materials are provided. The apparatus includes a substrate and a tie wrap. In at least one embodiment, the substrate is coupled to a rigid frame that is capable of accommodating a plurality of cables. The substrate and the tie wrap each have engaging mechanisms that enable them to create a hook and loop type releasable bond when pressed into contact with each other. The tie wrap is shaped to define an elongated body and a head portion having an interior opening. The body of the tie wrap may be pulled through the interior opening of the head portion in order to provide support for cables.

23 Claims, 5 Drawing Sheets

US 7,588,216 B1

FIBER OPTIC CABLING MANAGEMENT USING HOOK AND LOOP FABRIC

BACKGROUND OF THE INVENTION

1. Field of the Invention

This invention relates to telecommunications equipment and, more particularly, to the management of fiber optic cables using hook and loop fabric.

2. Description of the Related Art

In the telecommunications and data transmission industries, optical fibers, rather than metal cables, are used increasingly to transmit signals. The technology uses glass or plastic threads (fibers) to transmit data. A fiber optic cable consists of a bundle of threads, each of which is capable of transmitting messages modulated into light waves. Fiber optic cables are utilized in communication systems for carrying information between communication sources and sinks. An example of a communication system that utilizes fiber optic cable is an optical cross connect for a communications network Optical cable management has become a major concern in the design of telecommunications equipment. Fiber optic cable typically includes at least one glass core for optical, high bandwidth transmission of information. Typically, fiber optic cable requires a minimum bending radius (e.g., a one-inch bending radius) to avoid damaging the glass core and to avoid producing a large dB loss in the transmission of information through the cable. Therefore, optical cabling must be handled and stored to carefully avoid tight bends and kinks in the cabling.

The use of optical fibers to transmit data in the telecommunications industry has grown dramatically in recent years. With the increased use of optical fiber transmission paths, the industry has experienced a dramatic need for new and improved ways to effect fiber optic connections efficiently and with as little overhead costs as possible. This need becomes more critical and difficult to meet in newer systems that require increasingly large numbers of cables to be efficiently housed in a relatively small space. The high density of such systems creates a need for an organizational system that provides convenient access to the cables in order for technicians and test personnel to readily access a particular cable that needs to be removed, replaced, or otherwise accessed. By density, it is meant the number of locations per unit volume or unit area for providing connections between fiber optic cables on the chassis.

SUMMARY OF THE INVENTION

An apparatus is provided that uses hook and loop type releasable engagement to support cables. The apparatus includes a substrate and a cable fastener. The substrate has a first surface that contains one of a plurality of hook and loop mechanisms. These mechanisms may be hooks, mushroom-shaped stems, pine-tree shaped stems, or loops. The cable fastener is capable of releasable engagement to the substrate by means of a hook and loop connection. The tie wrap contains another of the hook and loop mechanisms to effect the releasable engagement. The cable fastener is shaped to be capable of defining a variable-width opening. In the preferred embodiment, the cable fastener is shaped to define an elongated body and an oval-shaped head. The head has an interior opening that accommodates pass-through of the elongated body to form a loop around the cables.

A method of managing cable is also provided. The method includes the steps of supporting one or more cables with a cable fastener and releasably engaging the cable fastener to a substrate. The cable fastener is shaped to be capable of defining a variable-width opening and contains one of a plurality of hook and loop mechanisms. The substrate contains another of the plurality of hook and loop mechanisms.

An apparatus that manages cable is also provided. The apparatus includes a cable fastener means for supporting one or more cables and a substrate means for releasably engaging the cable fastener means. The cable fastener means also includes a means for releasable engagement. In at least one embodiment, the cable fastener means includes a means for encircling the one or more cables such that each of the one or more cables is squeezed into contact with at least one other of the one or more cables.

An apparatus is also provided wherein the apparatus includes a rigid frame, a planar substrate, and a tie wrap. The rigid frame is capable of accommodating a plurality of cables and has at least one planar surface. The planar substrate has a first surface and a second surface, the second surface being coupled to the planar surface of the frame. The first surface of the planar substrate includes a plurality of engagement mechanisms. The tie wrap contains loops capable of engaging the engagement mechanisms of the substrate, wherein the tie wrap is capable of being releasably engaged to the substrate by means of a hook and loop connection. The tie wrap is shaped to define an elongated body having a predetermined width. The tie wrap is further shaped to define a head portion having a width greater than the predetermined width of the body. The head portion is shaped to define an opening through which the body of the tie wrap may be pulled.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

The following sets forth a detailed description of a mode for carrying out the invention. The description is intended to be illustrative of the invention and should not be taken to be limiting.

Figure 1:
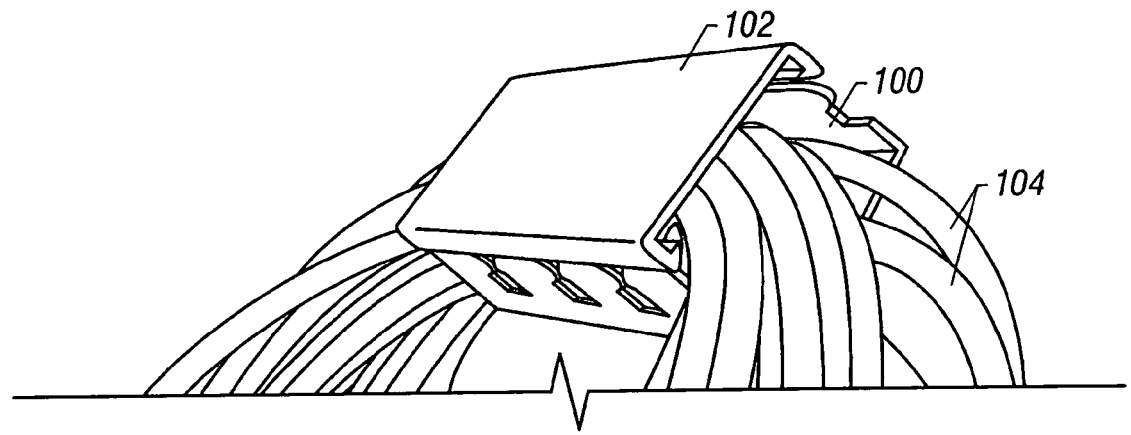
FIG. 1 illustrates a plan view of a prior art cable duct.
Figure 2:
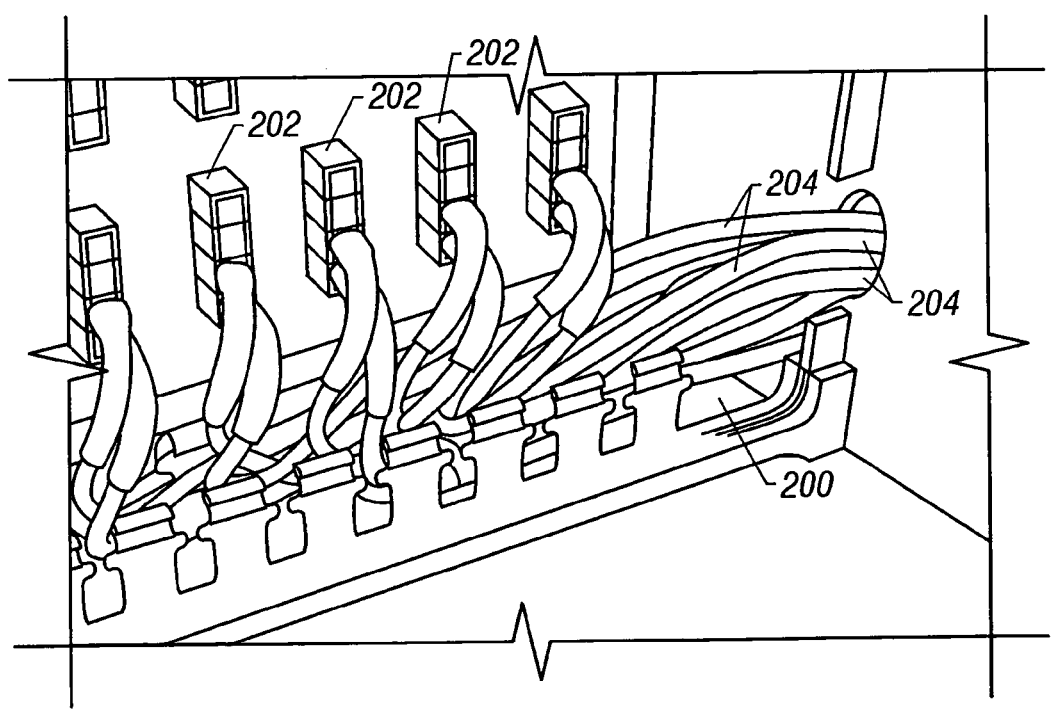
FIG. 2 illustrates a cable system incorporating a prior art cable duct.

FIGS. 1 and 2 illustrate prior art cable ducts 100, 200. Cable ducts 100, 200 are widely used to guide, support, and separate cabling and are considered an industry standard. The ducts 100, 200 are constructed of a rigid material, such as commercial-grade plastic, and have a rectangular cross section with a removable lid 102 to protect the cabling 104, 204. In traditional systems, cable ducts 100, 200 are adequate to separate and support cables.

FIG. 2 illustrates a dense system that utilizes a cable duct 200. FIG. 2 illustrates a plurality of cables 204 that are routed through the duct 200 and that have one end terminating at a connector 202. When a large number of cables 204 are routed through a traditional duct 200, the cables extend beyond the top of the duct. This makes it very difficult, if not impossible, to install the lid 102 (FIG. 1). In a dense system, even if the lid 102 (FIG. 1) is installed, the lid easily pops off when cable ducts are full (and also during temperature cycles). In contrast, when a lid is installed on a cable duct containing cables, a squeeze factor is often introduced that pushes the cables into contact with each other and into contact with the sides of the cable duct 200, thereby providing support for the cabling 204. Of course, if the cable duct 200 is not completely full, then it is unable to provide all-around support of cables 204 via this squeezing action, even with the lid on.

FIG. 2 illustrates that using a traditional cable duct 200 for a dense cable system presents both protection concerns and support concerns. The rigid rectangular-shaped ducts 200 cannot conform to the cables and thus have difficulty accommodating the required volume of cables for dense systems. Cables that extend beyond the top of the duct 200 are unsupported and unprotected. If the lid 102 (FIG. 1) cannot fit onto the duct 200, then even cables that lie within the duct 200 are unprotected on one side.

Lack of support for cables is undesirable. When vibration occurs, such as that incident to moving or shipping a telecommunications system or vibration incident to seismic activity, the weight of unsupported cables 204 pulling against the connector 202 can unseat the connector 202. In addition, excessive vibration can damage the fragile glass fibers within the cables 204. Another concern with unsupported cables that extend above the edge of a cable duct is the stress they can put on the cables underneath them. For instance, if a stress such as a jolt causes the top cables to momentarily move up into the air and jar back down, the dislodged cables bang on the lower cables when they come back down. This can cause damage to the lower cables even though they lie within the protection of the cable duct 200. Unsupported cables are also at risk of being damaged during transportation, manufacturing tests, and environmental operation if they are permitted to move in such a way that they bump into contact with other cables.

Figure 4:
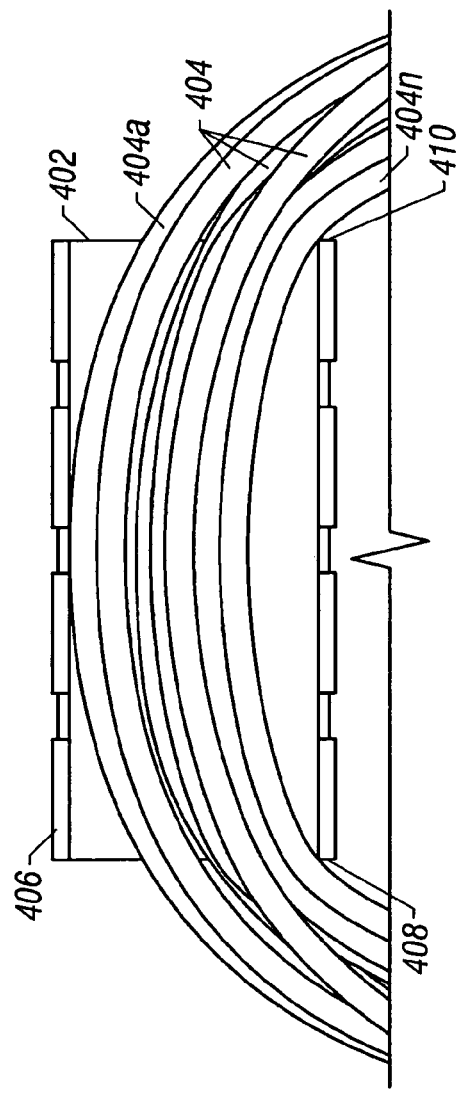
FIG. 4 illustrates a cross-sectional view of a prior art cable duct.

FIG. 4 illustrates an additional support limitation of traditional cable ducts 402. Even when the lid 406 is installed, the traditional duct 402 and lid 406 can only provide partial support for cables 404 that flex within the duct 402. FIG. 4 illustrates that cables, such as cable 404a, that are located at the top of the bundle's flexing arc, are supported by the rigid interior walls of the cable duct 402 only at one point at the approximate mid-point of the flexing arc. Cables, such as cable 404n, that are located at the bottom of the bundle's flexing arc, are supported only at the outside edges 408, 410 of the cable duct.

Another difficulty with traditional cable duct systems arises from the fact that the lid of the entire cable duct must be kept open (cover off) during assembly or repair until all cable placement or repair is complete. With dense high-volume cable systems it is difficult to keep the completed cabling from falling out of the ducts while additional cabling is being added or repaired.

Figure 3:
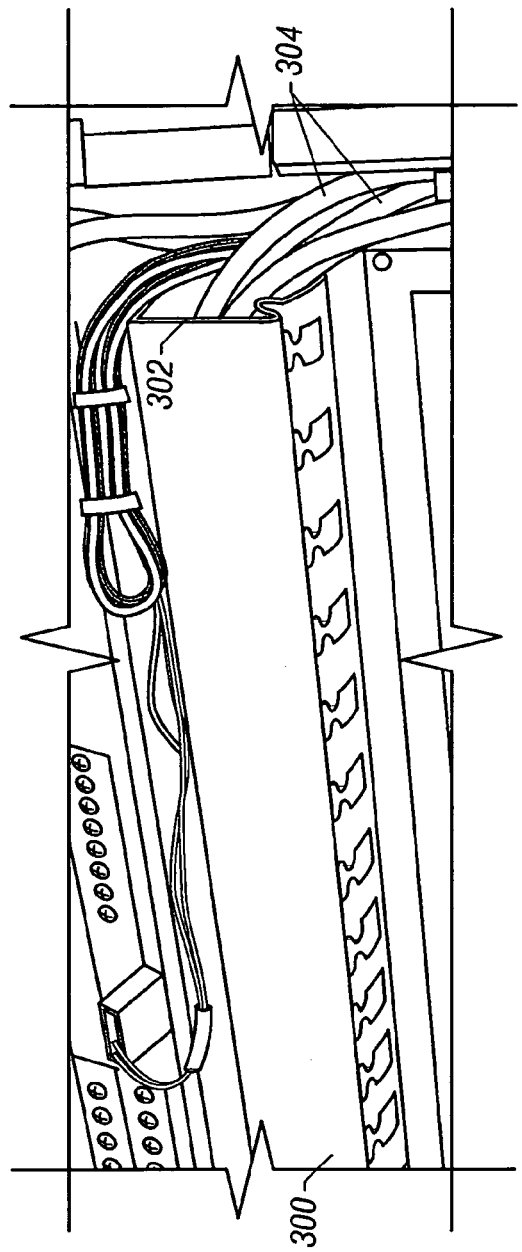
FIG. 3 illustrates a cable system incorporating a prior art cable duct.

FIG. 3 illustrates that another difficulty arises from the fact that the rigid edges of the cable duct 300 are prone to damaging cables 304 that must negotiate sharp turns at the edge 302 of the cable duct 300. When the weight of the cables 304 rests on the sharp edge 302 of the duct 300, damaging kinks can occur in the cables 304. Many cables 304 cannot operate when bent in a radius of less than one inch, yet are required to make sharp 90-degree turns at the edge 302 of a traditional cable duct 300. Such a kink or a too-sharp turn can result in a catastrophic defect in the cable 304. Another undesirable effect produced by having the weight of the cables 304 all supported by the edge 302 of the cable duct 300 is that the pressure of and weight of the cables 304 can cause the rigid plastic cable duct 300 to buckle and/or break.

Figure 5:
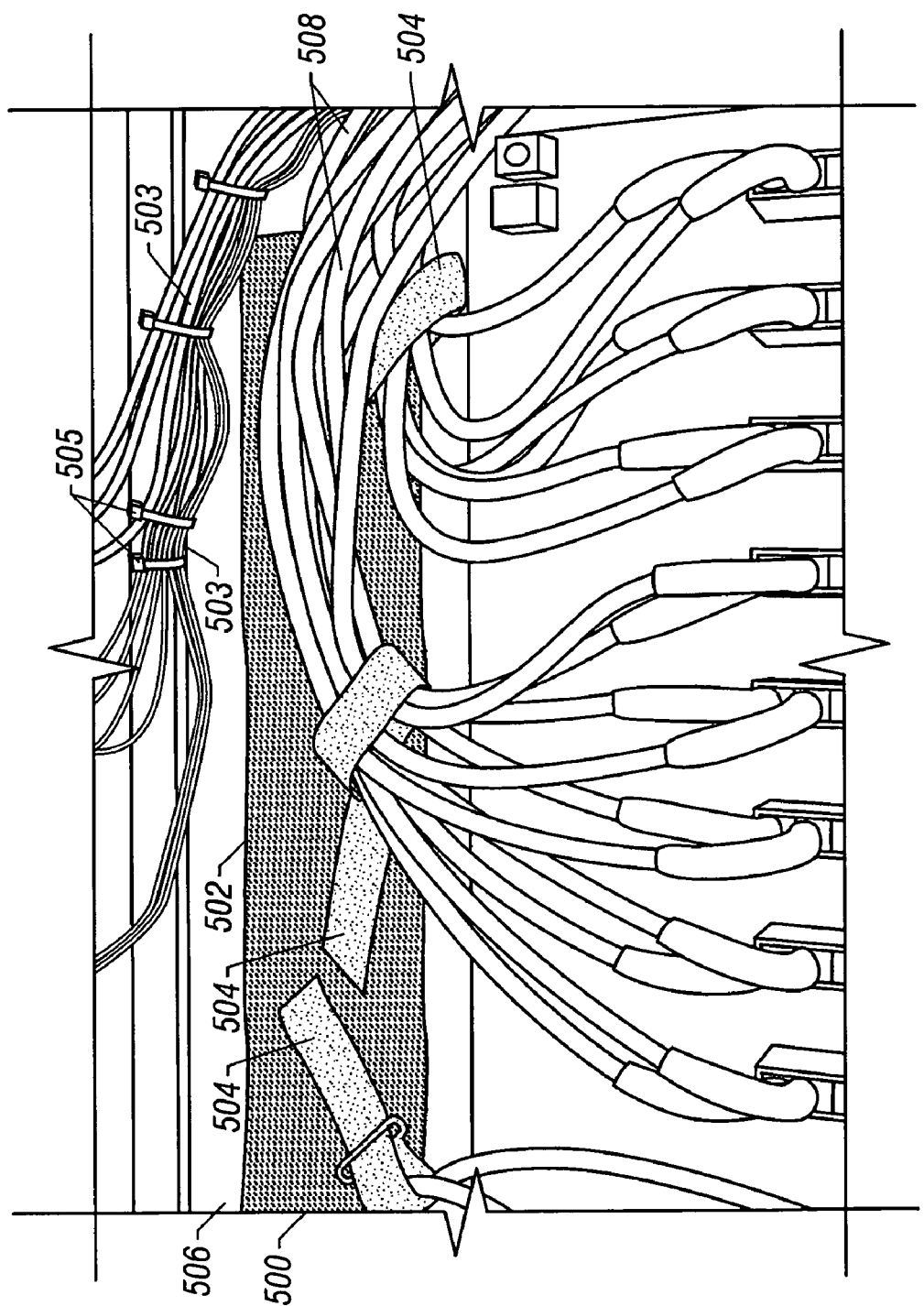
FIG. 5 illustrates a cable system incorporating a cable management apparatus according to at least one aspect of the present invention.

FIG. 5 illustrates exemplary plastic tie wraps 505 that are often used in traditional cable systems to wrap bundles of cables 503. These wrapped cables 503 are either attached to cable trays or some other structure. Cable tie wraps are often affixed to a system housing at pre-placed snaps or pre-drilled holes. Other cable tie wrap solutions utilize self-adhesive attachment. These schemes are limited in terms of where cables can be placed and how much cable weight they can support. The snap-in cable tie wraps can support a relatively large cable weight, but they must interact with pre-placed holes or other support devices. This arrangement does not accommodate complete flexibility in the placement of cables within a system. As the telecommunications system evolves through upgrading or up-scaling, the pre-placed support devices may become even less optimum. Cable tie schemes that are self-adhesive can sometimes overcome this type of placement restriction. On the other hand, the self-adhesive backing is usually a relatively small cross-section. As systems are scaled up or upgraded to accommodate additional cables, the weight of the cables can overcome the strength of the adhesive.

FIG. 5 also illustrates a cable management apparatus 500 according to one aspect of the present invention. The cable management apparatus 500 allows for flexible routing of cables within the system. The cable management apparatus 500 includes a substrate 502 and at least one cable fastener 504 that are capable of releasable engagement with each other. The cable fastener 504 can be any mechanism that can be made to encircle cables and conform to their width. For instance, the cable fastener could be a ring of plastic, fabric, string, or other malleable material, wherein the ring is of a construction that allows variable diameter sizing. One such embodiment would be an elastic ring coupled to an elongated body. In the preferred embodiment, the cable fastener 504 is a tie wrap as described below in connection with FIG. 6.

While the substrate can be of any shape, including tubular, in the preferred embodiment the back side of the substrate 502 is planar. The substrate 502 is sized and shaped to accommodate coupling to a frame 506 or other supporting structure. In at least one embodiment, the frame 506 is a rigid rectangular-shaped frame that is configured to support and manage a relatively large number of fiber optic cables to provide a dense cable system. The back side of the substrate 502 is coupled to the frame 506 by any conventional means, including adhesive, screws, and rivets. In at least one embodiment, the substrate 502 is coupled to the frame 506 in substantially the same position that a traditional cable duct 200 (FIG. 2), 300 (FIG. 3) would be placed, including both horizontal and vertical cable routing surfaces.

The substrate 502 is a piece of a hook and loop sheet material. As used in this application, "hook and loop" is used in a generalized sense to mean any of several reclosable fastening materials, such as Velcro™. While referred to as "hook" and "loop", the substrate 502 material need not necessarily comprise hooks or loops, but rather contain any of several engagement mechanisms. For instance, in the preferred embodiment, a flame-retardant industrial-grade material produced by 3M™ is used for the substrate 502. The material contains only the equivalent of "hooks," but they are not actually hooks. The material, known as Dual Lock™, is a polypropylene material containing hundreds of mushroom-shaped stems per square inch. When two pieces of Dual Lock™ material are pressed together, the mushroom-shaped stems interlock with each other, creating a separable bond. Alternative versions of Dual Lock™ materials provide pine-tree-shaped stems. A flame retardant Dual Lock™ fastener is further described in U.S. Pat. No. 5,691,021 issued to Kobe. As used herein, the term "hook and loop" is intended to encompass Velcro™, Dual Lock™, and any other similar material that provides a means for creating a releasable engagement bond.

FIG. 5 also illustrates the tie wraps 504. The tie wraps 504 are used to surround cable bundles, thereby providing separation and support for the cables 508. While they could contain any of the hook and loop type mechanisms described above (loop, hook, mushroom-shaped stem, pine-tree-shaped stem, etc.), the tie wraps 504 of the preferred embodiment are constructed of a material containing loops that create a separable bond when pressed into contact with the mushroom-shaped stems of the substrate 502.

Figure 6:
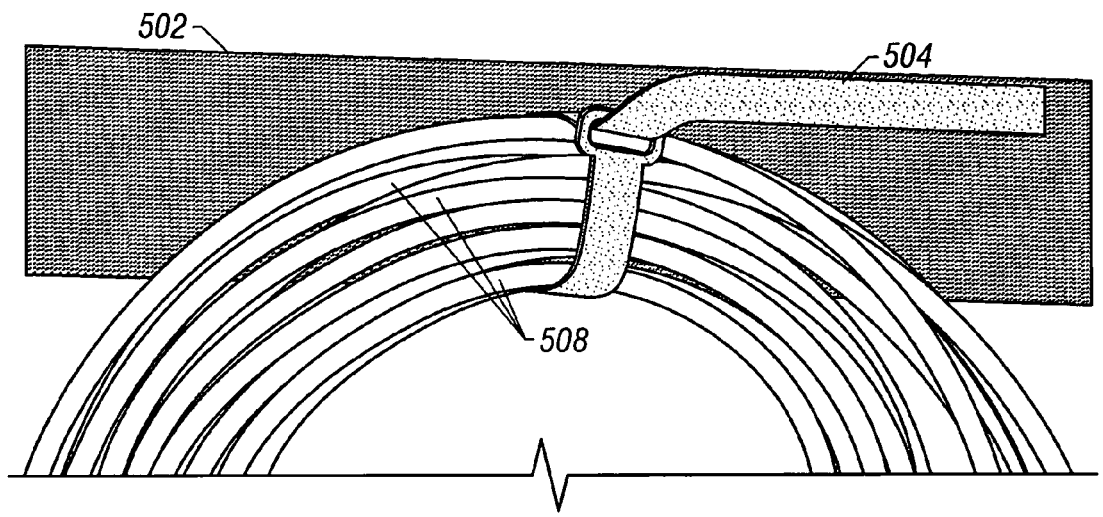
FIG. 6 illustrates a plan view of a cable management apparatus according to at least one aspect of the present invention.

FIG. 6 illustrates a tie wrap 504 surrounding a bundle of cables 508 and connected to the substrate 502. FIG. 6 illustrates that the tie wrap 504 is better able than the rigid cable ducts 200, 300 (FIG. 2 and FIG. 3, respectively) to conform to the size and shape of the cable bundle.

Figure 7:
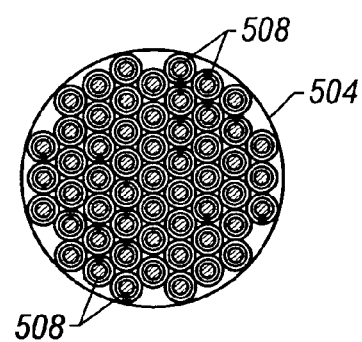
FIG. 7 illustrates a cross-sectional view of a cable management apparatus according to at least one aspect of the present invention, as installed on a frame.

FIG. 7 is a cross-sectional view, illustrating that the cables 508 in a bundle, when fastened by a tie wrap 504, are well-supported. The tie wrap 504 can be pulled tight around the cables, compressing the cables and causing each cable to be in supporting contact with at least one other cable and, in some cases, with the tie wrap 504 itself.

Figure 8:
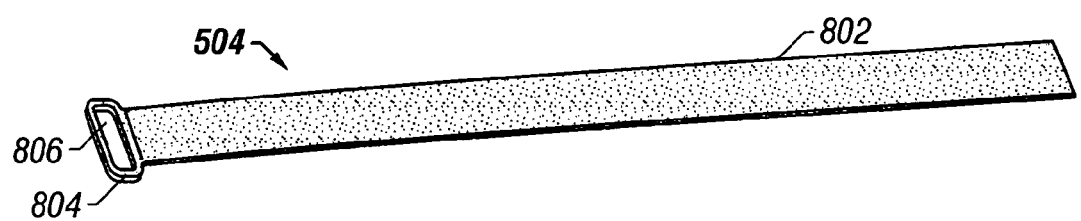
FIG. 8 illustrates a tie wrap according to at least one aspect of the present invention.
Figure 9:
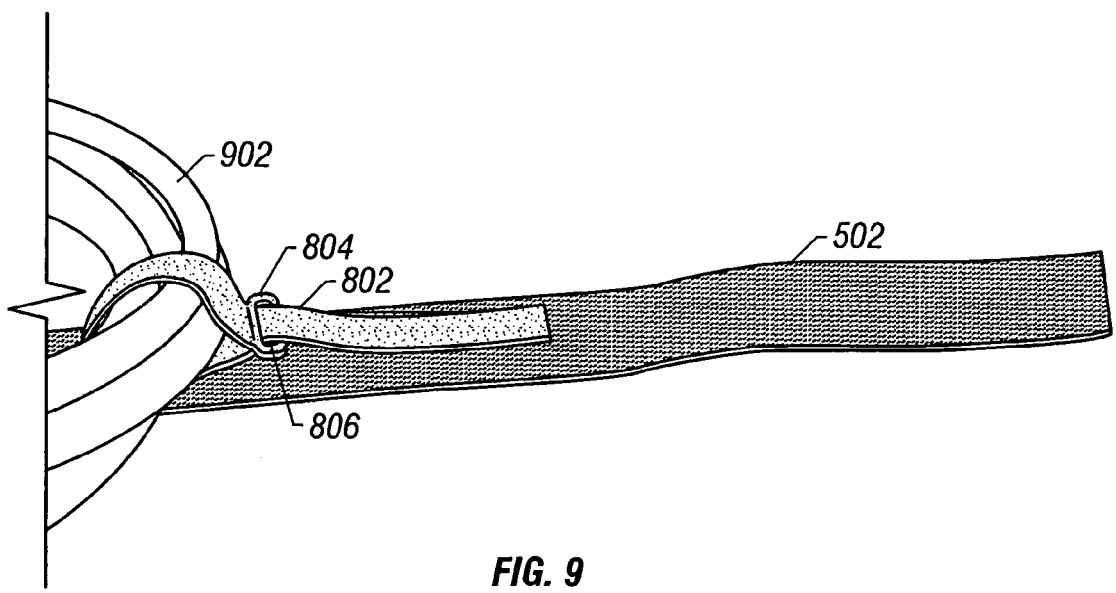
FIG. 9 illustrates a cross-sectional view of a cable management apparatus according to at least one aspect of the present invention.

FIGS. 8 and 9 illustrate a tie wrap 504 in detail. The tie wrap 504 is composed of a material having a means (such as hooks, mushroom-shaped stems, pine-tree-shaped stems, or loops) to effect a releasable engagement bond with the substrate 502. In the preferred embodiment, the tie wrap 504 contains loops that are configured to create a releasable bond when pressed into contact with the mushroom-shaped stems of the substrate 502. The tie wrap 504 includes an elongated body 802 and a head portion 804. The head portion 804 is substantially oval in shape and has outer edges that are shaped to define an interior opening 806. The head portion 804 is wider than the width of the body 802. One skilled in the art will recognize that alternative shapes will also accomplish the desired function, including round and rectangular-shaped heads.

FIG. 9 illustrates that head portion 804, being wider than the body, is sized such that the body can be pulled through the interior opening 806, thereby creating an encircling support structure for a bundle of cables 902. The loop structures of the body 802 are pressed into contact with the hook structures of the substrate 502, creating a releasable interlocking bond.

Returning to FIGS. 5 and 6, one can see that the engagement of the tie wrap 504 with the substrate 502 creates a cable management apparatus 500 that provides support and a means of segregation for the cables 508. The cable management apparatus 500 allows cables to bend at a more gradual angle than cables entering a traditional cable duct 300 (See FIG. 3). The cable management apparatus 500 provides the flexibility to place cables wherever they are needed within the frame 506, while providing a high level of support for the cables 508.

Flexibility is achieved by permitting a large number of cables to be bundled without the sacrifice in support that is required to accommodate a large number of cables within a traditional cable duct 300 (See FIG. 3). Additional flexibility is afforded by the fact that the cable management apparatus 500 permits cables bundled with tie wraps 504 to be placed at interim locations along the substrate 502. In contrast, traditional cable ties can only be placed at locations that provide a support mechanism such as a pre-drilled support hole. This pre-placement of support mechanisms does not afford the flexibility in cable support placement that is realized by the cable management apparatus 500 described herein.

The elongated body of the tie wrap 504 provides for a relatively large support surface for the bundled cables 508. The high surface area of contact between the body of the tie wrap 504 and the substrate 502 provides stronger support than traditional tie wraps that are supported with adhesive. Such traditional adhesive systems are limited in the amount of cable each tie wrap can support. An adhesive-backed tie wrap support provides a relatively small surface area of adhesive to support the cable weight. In dense systems, the weight of the cables can overcome the adhesive.

The cable management apparatus 500 also provides advantages in cabling systems that have different types of cables that must be segregated. For instance, some systems include both electrical and fiber optic cables that must be segregated from each other. The cable management apparatus 500 allows for such separation, providing for power cable bundles to be anchored down to the substrate 502 along side, but separate from, fiber optic cable bundles. It should be noted that the cable management apparatus 500 is intended to be used with any elongated cable-like materials including metal cables, fiber optic cables, electrical cords, wires, ropes, and the like.

Regarding installation and repair of cables, the cable support apparatus 500 provides distinctly advantageous features. The tie wraps 504 can be placed at several interim locations along the length of a cable bundle. The cables 508 can be accessed for repair simply by disengaging the tie wrap 504 from the substrate 502 and removing the body 802 (FIG. 8) from the interior opening 806 (FIG. 8). During installation of additional cables, the entire length of existing cables need not be exposed, as would be necessary when removing the lid from a traditional cable duct. Instead, one tie wrap at a time may be disengaged along the length of existing cables as new cables are installed. This permits cables to be supported at intervals so that assembly can move much more quickly without requiring unsupported exposure for the length of already-installed cables.

While particular embodiments of the present invention have been shown and described, it will be recognized to those skilled in the art that, based upon the teachings herein, further changes and modifications may be made without departing from this invention and its broader aspects and, thus, the appended claims are to encompass within their scope all such changes and modifications as are within the true spirit and scope of the invention.

What is claimed is:

1. An apparatus comprising:
 a rigid frame, wherein the rigid frame comprises at least one substantially planar surface;
 a substrate having a first surface and a second surface, wherein
  the second surface of the substrate is substantially opposite the first surface of the substrate,
  the first surface of the substrate comprises a first plurality of fasteners, the first plurality of fasteners is of one type of a plurality of types of hook and loop mechanisms, and
the second surface of the substrate is coupled to the substantially planar surface of the rigid frame; and
a cable fastener comprising a second plurality of fasteners, wherein
the second plurality of fasteners is of one type of the plurality of types of hook and loop mechanisms,
the second plurality of fasteners covers at least all of one side of the cable fastener,
the second plurality of fasteners is configured to engage the first plurality of fasteners,
the cable fastener is completely detachable from the substrate,
the second plurality of fasteners is configured not to engage any portion of the cable fastener,
the cable fastener is shaped to be capable of defining a variable-width opening,
the cable fastener is shaped to define an elongated body having a predetermined width,
the cable fastener is shaped to define a head portion at one end of the body,
the head portion has a width greater than the predetermined width, and
the head portion defines an opening through which the elongated body of the cable fastener can pass.

2. The apparatus recited in claim 1, wherein the first plurality of fasteners comprises one or more mushroom-shaped stems.

3. The apparatus recited in claim 1, wherein the first plurality of fasteners comprises one or more pine-tree-shaped stems.

4. The apparatus recited in claim 1, wherein the first plurality of fasteners comprises one or more hooks.

5. The apparatus recited in claim 1, wherein the first plurality of fasteners comprises one or more loops.

6. The apparatus recited in claim 1, wherein the cable fastener can be releasably coupled to any location on the substrate.

7. A method of managing cable, comprising:
supporting one or more cables with a cable fastener, wherein
the cable fastener is shaped to be capable of defining a variable-width opening,
the cable fastener comprises a strap on which are mounted a first plurality of one type of hook and loop mechanisms,
the first plurality of hook and loop mechanisms covers at least all of one side of the cable fastener, and
the first plurality of hook and loop mechanisms is configured not to engage any portion of the cable fastener;
releasably engaging the cable fastener to a substrate, wherein
the cable fastener is completely detachable from the substrate, and
the substrate comprises a second plurality of a second type of hook and loop mechanisms; and
providing a rigid frame, wherein
the rigid frame is configured to accommodate a plurality of fiber cables,
the rigid frame comprises at least one substantially planar surface, and
the substrate is coupled to the substantially planar surface of the rigid frame.

8. The method recited in claim 7, wherein the first plurality of hook and loop mechanisms comprises one or more mushroom-shaped stems.

9. The method recited in claim 7, wherein the first plurality of hook and loop mechanisms comprises one or more pine-tree-shaped stems.

10. The method recited in claim 7, wherein the first plurality of hook and loop mechanisms comprises one or more hooks.

11. The method recited in claim 7, wherein the first plurality of hook and loop mechanisms comprises one or more loops.

12. The method recited in claim 7, wherein the cable fastener can be releasably engaged to any location on the substrate.

13. The method recited in claim 7, wherein:
the cable fastener is shaped to define an elongated body having a predetermined width;
the cable fastener is shaped to define a head portion at one end of the body;
the head portion has a width greater than the predetermined width;
the head portion defines an opening through which the elongated body of the cable fastener can pass; and
the head portion has a size substantially similar to a size of the opening through which the elongated body of the cable fastener can pass.

14. The method recited in claim 7, wherein the one or more cables comprise one or more fiber optic cables.

15. The method recited in claim 7, wherein the one or more cables comprise one or more electrical cables.

16. An apparatus comprising:
means for supporting one or more cables, wherein
the means for supporting comprises a cable fastener, and
the cable fastener is shaped to define a variable-width opening;
means for releasably engaging the cable fastener to a substrate, wherein
the means for releasably engaging covers at least all of one side of the cable fastener,
the cable fastener is completely detachable from the substrate,
the means for releasably engaging comprises at least one engaging element selected from the group consisting of a mushroom-shaped stem, a pine-tree-shaped stem, a hook, and a loop, and
the means for releasably engaging is configured not to engage any portion of the cable fastener; and
a rigid frame wherein
the rigid frame is configured to releasably engage with the means for releasably engaging,
the rigid frame comprises at least one substantially planar surface, and
the substrate is coupled to the substantially planar surface of the rigid frame.

17. The apparatus recited in claim 16, wherein the cable fastener comprises:
means for encircling the one or more cables such that each of the one or more cables is squeezed into contact with at least one other of the one or more cables.

18. The apparatus recited in claim 16, wherein the one or more cables comprise one or more fiber optic cables.

19. The apparatus recited in claim 16, wherein the one or more cables comprise one or more electrical cables.

20. An apparatus for managing cable, comprising:
a rigid frame, wherein
the rigid frame is configured to accommodate a plurality of cables, and
the rigid frame has at least one planar surface;

a planar substrate having a first surface and a second surface, wherein
- the second surface of the substrate is substantially opposite the first surface of the substrate,
- the first surface of the substrate comprises a plurality of engagement mechanisms, and
- the second surface of the substrate is coupled to the planar surface of the rigid frame; and a tie wrap comprising loops, wherein
- the loops are configured to engage with the engagement mechanisms of the substrate,
- the loops cover at least all of one side of the tie wrap,
- the tie wrap is completely detachable from the substrate,
- the tie wrap can be releasably engaged to the substrate by a hook and loop connection,
- the loops are configured not to engage any portion of the tie wrap,
- the tie wrap is shaped to define an elongated body having a predetermined width,
- the tie wrap is shaped to define a head portion at one end of the elongated body,
- the head portion has a width greater than the predetermined width,
- the head portion defines an opening through which the elongated body of the tie wrap can pass.

21. The apparatus recited in claim 20, wherein the engagement mechanisms are mushroom-shaped stems.

22. The apparatus recited in claim 20, wherein the plurality of cables comprises a plurality of fiber optic cables.

23. The apparatus recited in claim 20, wherein the plurality of cables comprises one or more metal cables.

* * * * *